(12) United States Patent
Logan

(10) Patent No.: US 7,185,399 B2
(45) Date of Patent: Mar. 6, 2007

(54) METHOD AND APPARATUS FOR SECURING CABLES AND THE LIKE

(75) Inventor: Maurus Logan, Elizabeth, NJ (US)

(73) Assignee: Medcount Systems, C.L.C., Elizabeth, NJ (US)

(*) Notice: Subject to any disclaimer, the term of this patent is extended or adjusted under 35 U.S.C. 154(b) by 84 days.

(21) Appl. No.: 10/635,671

(22) Filed: Aug. 6, 2003

(65) Prior Publication Data
US 2005/0028326 A1 Feb. 10, 2005

(51) Int. Cl.
B65D 63/00 (2006.01)

(52) U.S. Cl. .................... 24/16 R; 24/16 PB; 248/74.3

(58) Field of Classification Search ................ 24/16 R, 24/16 PB, 30.5 P, 484; 411/437; 248/74.3, 248/74.2
See application file for complete search history.

(56) References Cited

U.S. PATENT DOCUMENTS

| | | | | |
|---|---|---|---|---|
| 3,022,557 A | * | 2/1962 | Logan | 248/74.3 |
| 3,149,808 A | * | 9/1964 | Weckesser | 248/74.3 |
| 4,700,432 A | * | 10/1987 | Fennell | 24/16 R |
| 4,779,828 A | * | 10/1988 | Munch | 248/74.3 |
| 5,354,021 A | * | 10/1994 | Farrell | 248/74.3 |
| 5,632,457 A | * | 5/1997 | Neely, Jr. | 24/16 PB |
| 6,330,989 B1 | * | 12/2001 | Okamoto | 24/16 R |

* cited by examiner

Primary Examiner—Jack W. Lavinder
(74) Attorney, Agent, or Firm—James J. Daley

(57) ABSTRACT

In combination, a conventional cable tie and a cable encircling member having a width exceeding the width of the cable tie. The cable encircling member has an opening extending between upper and lower surfaces thereof. The free end of the cable tie tail is inserted from the upper surface of the cable engaging member through the opening and the tail of the cable tie is dressed along the lower surface of the cable engaging member such that the free end of the cable tie extends outwardly of an end of the cable encircling member. Conductors to be ensnared are now laid upon the upper surface of the cable encircling member. The free end of the cable tie tail is now inserted into the head of the cable tie forming the cable encircling member into a spiral coil loosely encircling the conductors. The free end of the cable tie is now pulled beyond the cable tie head until the spiral coil moves into tightly encircling relation with the conductors.

5 Claims, 2 Drawing Sheets

METHOD AND APPARATUS FOR SECURING CABLES AND THE LIKE

FIELD OF THE INVENTION

The present invention relates generally to securement apparatus and methods and pertains more particularly to securement apparatus using so-called "cable ties".

BACKGROUND OF THE INVENTION

For many years, the electrical cable industry has had the benefit of cable ties to encircle and ensnare groupings of conductors. Applicant's U.S. Pat. Nos. 3,022,557 and 3,047,945, now expired, respectively show examples of cable ties and tensioning apparatus for use in assembling cable ties and conductor groupings. As shown in these patents, cable ties are typically molded plastic members having a head portion and a tail portion extending from the head portion to a free end. The head portion typically includes a pawl member extending into a tail portion passage extending fully through the head portion. The tail portion is routed about the conductors to be ensnared and has serrations on one or both outer surfaces thereof designed to pass by the pawl member under the pulling pressure of a person or a pulling tool, the pawl retentively engaging the serrations to form a cable tie loop tightly encircling the conductors.

In more recent years, the benefit of cable ties has spread to optical conductors, i.e., optical fibers. In such applications, however, there is concern for binding pressure of the cable ties interfering with signal transmission through the optical conductors. The use of the customary cable tie and tensioning device is problematic in this respect, placing such pressure on the optical conductors as to change characteristics thereof and interfere with desired signal transmission therein.

To overcome this problem, the industry has looked to so-called "hook and loop" type fasteners, currently sold under brand names such as GET-A-GRIP, Velchro and Aplix, all of which are registered trademarks.

U.S. Pat. No. 6,484,371 B1 discloses forms of hook and loop fasteners and indicates difficulties attendant on hook and loop fasteners theretofore known.

One such difficulty is referred to as "notch sensitivity", i.e., a pronounced tendency to tear in one or more directions when a base film of the fastener is notched or nicked, the tearing propagating between rows of hooks.

Other difficulties include the stiffness or flex modulus of the backing material or base film and the thickness of the backing material. This precludes winding the fastener into a tight radius as is required in the bundling of small items, e.g., groups of optical fibers. This also gives rise to the fastener contributing substantially to the overall diameter of the bundled goods, defeating use thereof in areas where space is at a premium.

Another difficulty is that high flex modulus contributes to flagging, i.e., the tendency of the fastener to decouple from itself at the terminal end of the mating surfaces. Flagging also is said to give rise to a cavity in the fastener in which external contaminants can accumulate and contribute to a decrease in the integrity of the coupling after repeated uses.

Further, high flex modulus fasteners also conform more poorly to surfaces that they are wrapped around, making them more prone to slippage, since less of the fastener surface is in contact with the substrate. Moreover, where the fastener conforms so poorly to the surfaces of the bundled goods, the stress applied to the bundled goods is not evenly distributed. In the case of delicate goods, such as optical fibers, this may result in cracking or breaking of the individual fibers or in signal distortion.

Hook and loop fasteners, lastly, due to the bulk thereof, are more costly on a materials basis than conventional cable ties.

SUMMARY OF THE INVENTION

The present invention has, as its primary object, the provision of cable ties having adaptivity to applications presently served by hook and loop fasteners, e.g., the bundling of optical conductors.

A more particular object of the present invention is to afford method and apparatus for providing improved control of pressure conditions in effecting cable tie assemblies of electrical or optical conductors.

In attaining this and other objects, the invention provides, in one aspect, apparatus comprising a cable tie and structure cooperative therewith for providing such improved pressure conditions in the assemblies of cable ties and electrical or optical conductors.

More particularly, the invention provides in such one aspect, in combination, a conventional cable tie and a cable encircling member having a width exceeding the width of the cable tie. The cable encircling member has an opening extending between upper and lower surfaces thereof. The free end of the cable tie tail is inserted from the upper surface of the cable engaging member through the opening and the tail of the cable tie is dressed along the lower surface of the cable engaging member such that the free end of the cable tie extends outwardly of an end of the cable encircling member.

Conductors to be ensnared are now laid upon the upper surface of the cable encircling member. The free end of the cable tie tail is now inserted into the head of the cable tie forming the cable encircling member into a spiral coil loosely encircling the conductors. The free end of the cable tie is now pulled beyond the cable tie head until the spiral coil moves into tightly encircling relation with the conductors.

The foregoing and other objects of the invention and the various structures of the further member will be further understood from the following detailed description of preferred embodiments and practices of the invention and from the drawings wherein like components are identified by like reference numerals.

DETAILED DESCRIPTION OF PREFERRED EMBODIMENTS

Figure 1:
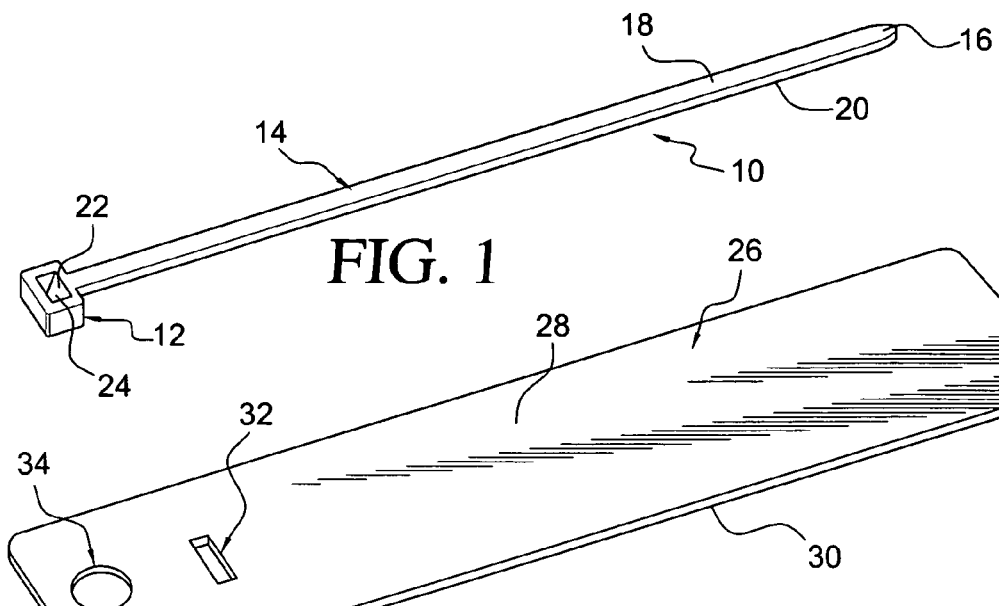
FIG. 1 is perspective view of a conventional cable tie.

Referring to FIG. 1, conventional cable tie 10 includes a head portion 12 and a tail portion 14 contiguous with head portion 12 and extending to tail portion free end 16. Serrations (not shown) are formed on either or both of top and bottom sides 18 and 20 of tail portion 14. Head portion 12 includes pawl 22 extending into through passage 24. As is known, pawl 22 may be a plastic member integrally formed with cable tie 10 or may be a metal member.

Figure 2:
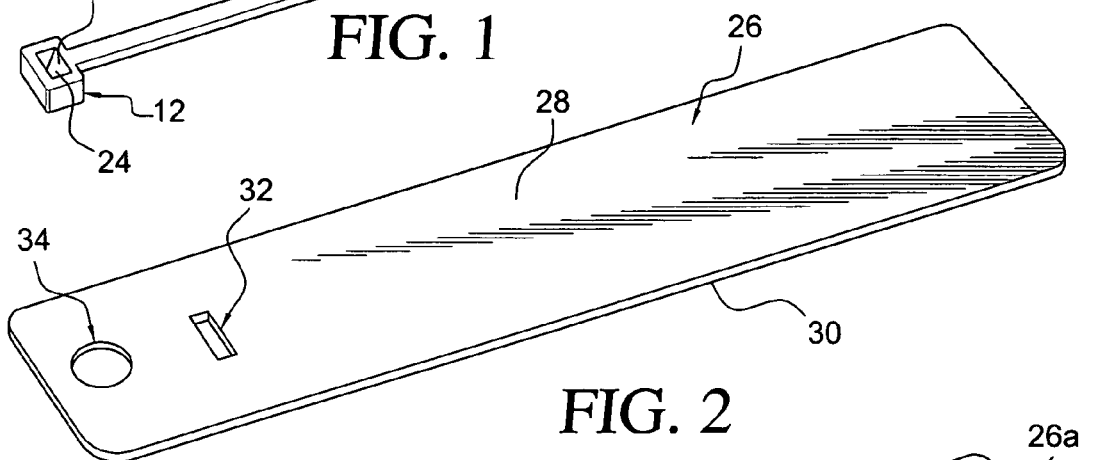
FIG. 2 is a perspective view of a first embodiment of a cable encircling member in accordance with the invention for assembly with the FIG. 1 cable tie.

Turning to FIG. 2, cable encircling member 26 is preferably a thin, flexible, rectangular strip of plastic material, having upper surface 28 and lower surface 30. Opening 32 extends between upper surface 28 and lower surface 30 and is of configuration facilitating passage of tail portion free end 16 through cable encircling member 26.

Figure 3:
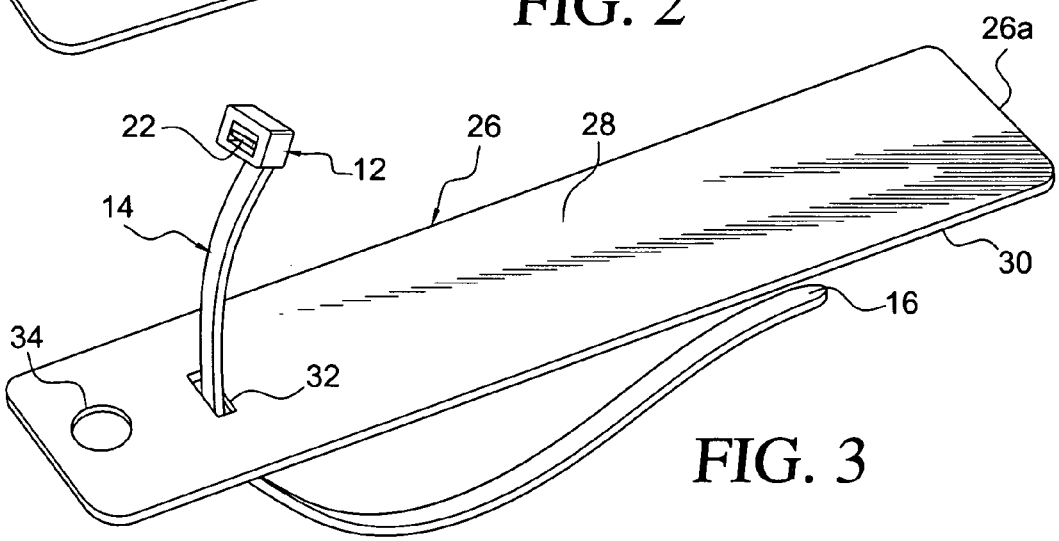
FIG. 3 is a perspective view of an initial assembly of the components of FIGS. 1 and 2.

Referring to FIG. 3, it shows an initial assembly of the components of FIGS. 1 and 2, wherein tail portion free end 16 has been passed through opening 32 and tail portion 14 is dressed along the lower surface 30 of cable encircling member 26, the components being configured such that tail portion free end 16 is disposed outwardly of end 26a of cable encircling member 26.

Figure 4:
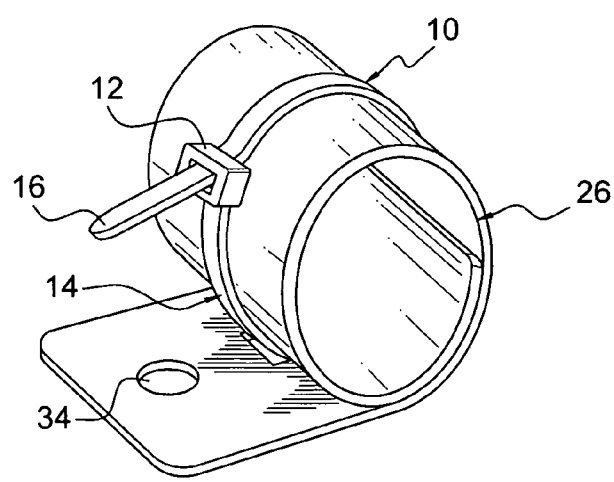
FIG. 4 is a perspective view of a final assembly of the components of FIGS. 1 and 2.

Conductors (not shown) to be ensnared are now laid upon upper surface 28 of cable encircling member 26. Turning to FIG. 4, free end 16 of cable tie tail portion 14 is now inserted into head portion 12 of cable tie 10 forming cable encircling member 26 into a spiral coil loosely encircling the conductors. The free end 16 of cable tie 10 is now pulled beyond cable tie head portion 12, to the left in FIG. 4 until the spiral coil moves into tightly encircling relation with the conductors.

Aperture 34 is formed in cable encircling member 26 and a screw or bolt (not shown) may be passed through the aperture to secure the FIG. 4 assembly to a mounting plate.

Figure 5:
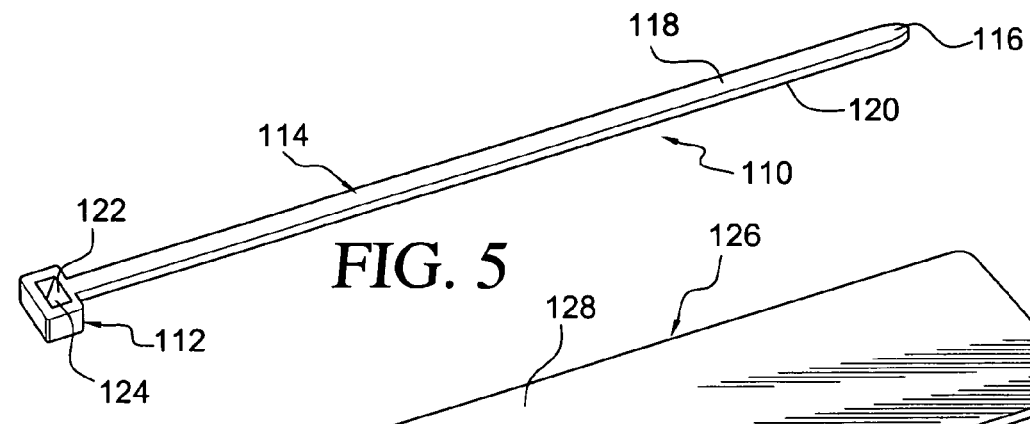
FIG. 5 is perspective view of a conventional cable tie.

Referring to FIG. 5, conventional cable tie 110 includes a head portion 112 and a tail portion 114 contiguous with head portion 112 and extending to tail portion free end 116. Serrations (not shown) are formed on either or both of top and bottom sides 118 and 120 of tail portion 114. Head portion 112 includes pawl 122 extending into through passage 124. As is known, pawl 122 may be a plastic member integrally formed with cable tie 110 or may be a metal member.

Figure 6:
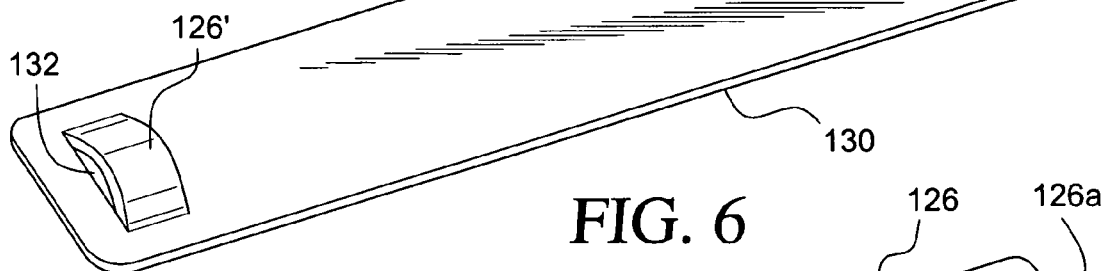
FIG. 6 is a perspective view of a second embodiment of a cable encircling member in accordance with the invention for assembly with the FIG. 5 cable tie.

Turning to FIG. 6, cable encircling member 126 is preferably a thin, flexible, rectangular strip of plastic material, having upper surface 128 and lower surface 130. Opening 132 is formed by cutting slits through upper surface 128 and lower surface 130 and raising portion 126' above upper surface 128 and is of configuration facilitating passage of tail portion free end 116 through cable encircling member 126.

Figure 7:
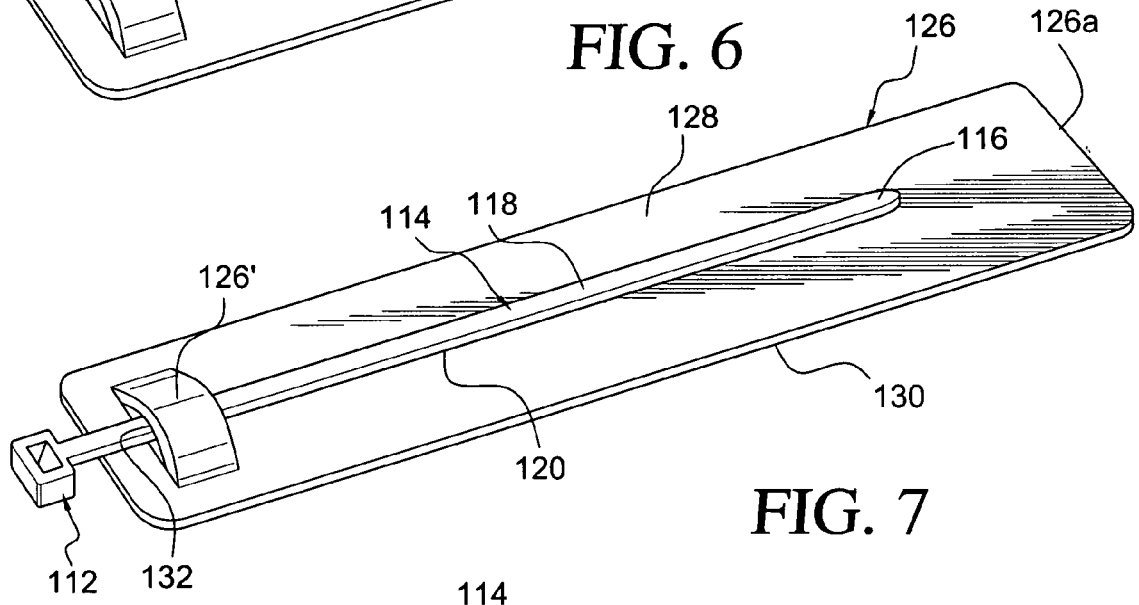
FIG. 7 is a perspective view of an initial assembly of the components of FIGS. 5 and 6.

Referring to FIG. 7, it shows an initial assembly of the components of FIGS. 5 and 6, wherein tail portion free end 116 has been passed through opening 132 and tail portion 114 is dressed along upper surface 128 of cable encircling member 126, the components being configured such that tail portion free end 116 is disposed outwardly of end 126a of cable encircling member 126.

Figure 8:
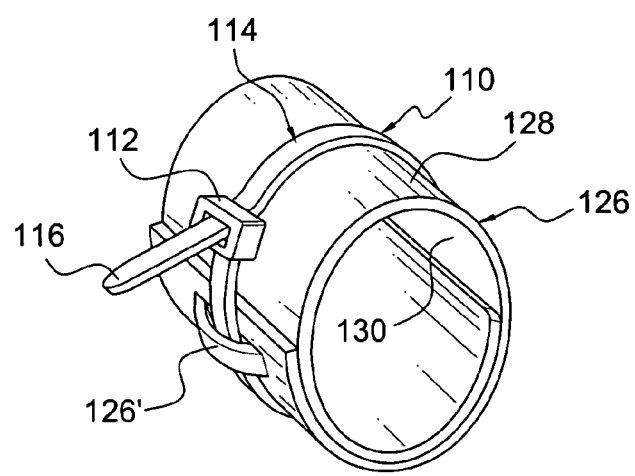
FIG. 8 is a perspective view of a final assembly of the components of FIGS. 5 and 6.

The initial assembly of FIG. 7 is now inverted from its therein shown disposition such that lower surface 130 becomes the upper surface of cable encircling member 126. Conductors (not shown) to be ensnared are now disposed on surface 130 of cable encircling member 126. Turning to FIG. 8, free end 116 of cable tie tail portion 114 is now inserted into head portion 112 of cable tie 110 forming cable encircling member 126 into a spiral coil loosely encircling the conductors. The free end 116 of cable tie 110 is now pulled beyond cable tie head portion 112, to the left in FIG. 8 until the spiral coil moves into tightly encircling relation with the conductors.

By way of summary of the foregoing and introduction to the ensuing claims, the invention will be seen, in its apparatus aspect, to provide apparatus for bundling conductors, comprising:
  (a) a cable tie having a head and a strap extending from the head to a strap free end; and
  (b) a cable encircling member having a width exceeding a width of the cable tie strap,
  the cable tie being assembled with the cable encircling member and forming the cable encircling member into a spiral coil interiorly of the cable tie and encircling the conductors.

In one embodiment, the cable encircling member defines an aperture extending between first and second outer surfaces of the cable encircling member, the cable tie strap being resident in the aperture. In such one embodiment, the cable tie strap encircles the second outer surface of the cable encircling member and the first outer surface is in engagement with the conductors.

In another embodiment, the cable encircling member defines a passage extending along a first outer surface of the cable encircling member, the cable tie strap being resident in the passage. In such other embodiment, the cable tie strap encircles the first outer surface of the cable encircling member and a second outer surface of the cable encircling member is in engagement with the conductors.

In its method aspect, the invention will be seen to provide a method for bundling conductors, comprising the steps of:
  (a) providing a cable tie having a head and a strap extending from the head to a strap free end;
  (b) providing a cable encircling member having a width exceeding a width of the cable tie strap;
  (c) assembling the cable tie and the cable encircling member such that the cable tie strap overlies a first outer surface of the cable encircling member;
  (d) forming the cable encircling member into a spiral coil interiorly of the cable tie and encircling the conductors.

Various changes to the particularly depicted embodiments and practices of the invention may be introduced without departing from the scope of the invention. Accordingly, it is to be appreciated that the particularly disclosed embodiments are intended in an illustrative, and not in a limiting, sense. The true spirit and scope of the invention is set forth in the ensuing claims.

What is claimed is:

1. A method for bundling conductors, comprising the steps of:
  (a) providing a single cable tie having a head and a strap extending from the head to a strap tree end;
  (b) providing a cable encircling member having a width exceeding a width of said cable tie strap and in flattened state throughout a full length thereof;
  (c) assembling said single cable tie and said cable encircling member such that said cable tie strap overlies a first outer surface of said cable encircling member; and
  (d) forming said cable encircling member from such flattened state into a spiral coil interiorly of said cable tie and encircling said conductors.

2. The method claimed in claim 1, wherein said step (d) is practiced at least one location longitudinally of said conductors.

3. The method claimed in claim 1, wherein said conductors are selected to be of a given total number and wherein said step (d) is practiced by disposing said cable encircling member in encircling relation to the entirety of said given number of conductors.

4. The method claimed in claim 1, wherein step (b) is practiced by providing said cable encircling member with an aperture extending between first and second outer surfaces of said cable encircling member, and wherein said step (c) is practiced by rendering said cable tie strap resident in said aperture.

5. The method claimed in claim 1, wherein said step (b) is practiced by providing said cable encircling member with a passage extending along a first outer surface of said cable encircling member, and wherein said step (c) is practiced by rendering said cable tie strap resident in said passage.

* * * * *